United States Patent
Wagner et al.

(10) Patent No.: US 10,315,276 B2
(45) Date of Patent: Jun. 11, 2019

(54) METHOD FOR PRODUCING A GLASS CERAMIC ELEMENT WITH PATTERNED COATING

(71) Applicant: SCHOTT AG, Mainz (DE)

(72) Inventors: Fabian Wagner, Mainz (DE); Holger Waldschmidt, Nieder-Wiesen (DE)

(73) Assignee: SCHOTT AG, Mainz (DE)

( * ) Notice: Subject to any disclaimer, the term of this patent is extended or adjusted under 35 U.S.C. 154(b) by 440 days.

(21) Appl. No.: 14/966,403

(22) Filed: Dec. 11, 2015

(65) Prior Publication Data

US 2016/0169531 A1 Jun. 16, 2016

(30) Foreign Application Priority Data

Dec. 12, 2014 (DE) .......... 10 2014 118 497
Mar. 10, 2015 (DE) .......... 10 2015 103 518

(51) Int. Cl.
*F24C 15/10* (2006.01)
*C03C 23/00* (2006.01)
(Continued)

(52) U.S. Cl.
CPC ........... *B23K 26/36* (2013.01); *B23K 26/352* (2015.10); *B23K 26/361* (2015.10);
(Continued)

(58) Field of Classification Search
None
See application file for complete search history.

(56) References Cited

U.S. PATENT DOCUMENTS 1,492,402 A * 4/1924 Skinner ............... B44C 1/26
156/257
2,632,134 A * 3/1953 Reid ................... G01R 31/257
324/404
(Continued)

FOREIGN PATENT DOCUMENTS

DE 3433880 A1 * 3/1986 .......... F24C 15/102
DE 4304953 A1 * 8/1994 .......... B44D 3/166
(Continued)

OTHER PUBLICATIONS

Machine Translation of JP 2008239405 A, Oct. 2008 (Year: 2008).*
(Continued)

*Primary Examiner* — Jeffrey A Vonch
(74) *Attorney, Agent, or Firm* — Ohlandt, Greeley, Ruggiero & Perle, L.L.P.

(57) ABSTRACT

A method is provided for producing a glass ceramic element with a patterned coating is provided. The method includes: providing a glass ceramic element with a coating which is at least partially light-blocking and preferably opaque in the visible spectral range; irradiating the glass ceramic element with a pulsed laser beam on the face provided with the coating so that the coating is removed by ablation; during irradiating the laser beam is directed over the surface of the glass ceramic element so that a portion of the coating is removed which has a greater lateral extent than the diameter of the laser beam; and once the coating has been removed, irradiating the glass ceramic with the laser in the region where the coating has been removed, thereby optically modifying the glass ceramic in the irradiated region.

12 Claims, 5 Drawing Sheets

(51) Int. Cl.

| | | |
|---|---|---|
| C03C 4/08 | (2006.01) | |
| C03C 17/00 | (2006.01) | |
| C03C 17/34 | (2006.01) | |
| B23K 26/352 | (2014.01) | |
| B23K 26/36 | (2014.01) | |
| B23K 26/53 | (2014.01) | |
| B32B 5/14 | (2006.01) | |
| B32B 3/26 | (2006.01) | |
| B32B 3/30 | (2006.01) | |
| B23K 26/362 | (2014.01) | |
| B23K 26/361 | (2014.01) | |
| B32B 18/00 | (2006.01) | |
| B32B 17/06 | (2006.01) | |
| B23K 103/00 | (2006.01) | |
| B23K 26/354 | (2014.01) | |
| C03C 4/00 | (2006.01) | |
| C03C 17/23 | (2006.01) | |
| C03C 17/22 | (2006.01) | |
| B23K 26/359 | (2014.01) | |
| B23K 26/082 | (2014.01) | |
| B23K 26/0622 | (2014.01) | |
| B23K 101/34 | (2006.01) | |

(52) U.S. Cl.
CPC ............ *B23K 26/362* (2013.01); *B23K 26/53* (2015.10); *B32B 3/263* (2013.01); *B32B 3/266* (2013.01); *B32B 3/30* (2013.01); *B32B 5/142* (2013.01); *B32B 5/147* (2013.01); *C03C 23/0025* (2013.01); *F24C 15/10* (2013.01); *B23K 26/0624* (2015.10); *B23K 26/082* (2015.10); *B23K 26/354* (2015.10); *B23K 26/359* (2015.10); *B23K 26/3584* (2018.08); *B23K 2101/34* (2018.08); *B23K 2103/50* (2018.08); *B23K 2103/52* (2018.08); *B23K 2103/54* (2018.08); *B32B 17/06* (2013.01); *B32B 18/00* (2013.01); *B32B 2307/41* (2013.01); *B32B 2307/412* (2013.01); *B32B 2307/414* (2013.01); *B32B 2310/0843* (2013.01); *B32B 2509/00* (2013.01); *C03C 4/0071* (2013.01); *C03C 17/002* (2013.01); *C03C 17/22* (2013.01); *C03C 17/23* (2013.01); *C03C 17/34* (2013.01); *C03C 2201/30* (2013.01); *C03C 2201/34* (2013.01); *C03C 2201/40* (2013.01); *C03C 2201/42* (2013.01); *C03C 2201/54* (2013.01); *C03C 2217/70* (2013.01); *C03C 2217/72* (2013.01); *C03C 2218/328* (2013.01); *C03C 2218/36* (2013.01); *Y10T 428/2457* (2015.01); *Y10T 428/24331* (2015.01); *Y10T 428/24355* (2015.01); *Y10T 428/24802* (2015.01); *Y10T 428/24893* (2015.01); *Y10T 428/24901* (2015.01); *Y10T 428/24926* (2015.01); *Y10T 428/24942* (2015.01)

(56) References Cited

U.S. PATENT DOCUMENTS

| | | | | |
|---|---|---|---|---|
| 2,651,146 | A * | 9/1953 | Stookey | C03C 3/112 501/68 |
| 2,682,134 | A * | 6/1954 | Stookey | C03C 4/02 204/157.51 |
| 4,000,334 | A * | 12/1976 | Hallman | B23K 26/0661 430/348 |
| 4,336,303 | A * | 6/1982 | Rittler | C03B 11/06 428/334 |
| 4,451,329 | A * | 5/1984 | Batchelor | B44C 1/227 216/31 |
| 4,769,310 | A * | 9/1988 | Gugger | B44B 7/00 430/346 |
| 4,816,376 | A * | 3/1989 | Toshida | C03C 17/32 430/272.1 |
| 5,030,551 | A * | 7/1991 | Herren | B41M 5/262 347/224 |
| 5,206,496 | A * | 4/1993 | Clement | B29C 71/04 219/121.6 |
| 5,491,115 | A * | 2/1996 | Pfitzenmaier | C03C 4/02 501/4 |
| 5,716,712 | A * | 2/1998 | Schonig | C03C 17/3411 428/210 |
| 6,369,365 | B1 * | 4/2002 | Nass | H05B 3/74 219/445.1 |
| 6,515,263 | B2 * | 2/2003 | Mitra | C03C 10/0027 219/443.1 |
| 6,914,223 | B2 * | 7/2005 | Krause | B44C 1/14 219/460.1 |
| 6,916,524 | B1 * | 7/2005 | Yeo | B41M 5/262 428/195.1 |
| 6,919,162 | B1 * | 7/2005 | Brennen | G01N 30/6095 430/272.1 |
| 9,629,271 | B1 * | 4/2017 | Lancaster-Larocque | H05K 5/03 |
| 2003/0044582 | A1 * | 3/2003 | Sakoske | B41M 1/12 428/195.1 |
| 2004/0031778 | A1 * | 2/2004 | Koyama | C03C 17/23 219/121.69 |
| 2005/0044895 | A1 * | 3/2005 | Yamate | C03C 4/02 65/111 |
| 2005/0073823 | A1 * | 4/2005 | Engelmann | A47L 15/4293 362/23.07 |
| 2005/0155955 | A1 * | 7/2005 | Daskal | B23K 26/389 219/121.68 |
| 2005/0167416 | A1 * | 8/2005 | Vilato | C03B 13/08 219/452.11 |
| 2005/0224491 | A1 * | 10/2005 | Vilato | C03C 17/04 219/443.1 |
| 2006/0091135 | A1 * | 5/2006 | Kondo | H05B 6/1218 219/621 |
| 2006/0119956 | A1 * | 6/2006 | Hashimoto | C03C 23/0025 359/652 |
| 2007/0295711 | A1 * | 12/2007 | Striegler | C03C 8/18 219/448.11 |
| 2008/0190409 | A1 * | 8/2008 | Demol | C03C 17/38 126/211 |
| 2008/0264931 | A1 * | 10/2008 | Vilato | C03C 17/00 219/622 |
| 2008/0290082 | A1 * | 11/2008 | Tallet | C03B 13/08 219/452.11 |
| 2008/0299501 | A1 * | 12/2008 | Borrelli | C03C 3/095 430/323 |
| 2009/0233082 | A1 * | 9/2009 | Esemann | B44C 3/02 428/319.1 |
| 2009/0291261 | A1 * | 11/2009 | Hidaka | B28D 1/00 428/156 |
| 2010/0028629 | A1 * | 2/2010 | Anton | B44C 3/02 428/201 |
| 2010/0047556 | A1 * | 2/2010 | Bockmeyer | C03C 17/007 428/324 |
| 2010/0089905 | A1 * | 4/2010 | Nelson | H05B 3/74 219/452.11 |
| 2010/0143744 | A1 * | 6/2010 | Gupta | B23K 26/0084 428/601 |
| 2010/0219176 | A1 * | 9/2010 | Striegler | C03C 17/02 219/443.1 |
| 2010/0304948 | A1 * | 12/2010 | Comte | C03C 3/085 501/32 |
| 2011/0039072 | A1 * | 2/2011 | Grzybowski | C03B 23/02 428/156 |
| 2011/0226231 | A1 * | 9/2011 | Siebers | C03C 3/087 126/211 |
| 2012/0125314 | A1 * | 5/2012 | Alonso Esteban | C03C 17/36 126/211 |

(56) References Cited

U.S. PATENT DOCUMENTS

| | | | | |
|---|---|---|---|---|
| 2012/0125315 A1* | 5/2012 | Alonso Esteban | ..... | C03C 17/36 126/211 |
| 2012/0300304 A1* | 11/2012 | Gollier | .................... | C03C 15/00 359/599 |
| 2013/0083519 A1* | 4/2013 | Frank | .................... | G09F 9/3023 362/231 |
| 2013/0098903 A1* | 4/2013 | Di Giovanni | ....... | C03C 10/0027 219/622 |
| 2013/0140293 A1* | 6/2013 | Doerk | .................. | C03C 10/0009 219/452.12 |
| 2013/0164509 A1* | 6/2013 | Siebers | ............... | C03C 10/0027 428/210 |
| 2013/0248502 A1* | 9/2013 | Alaman Aguilar | ..... | C03C 17/36 219/121.69 |
| 2013/0286630 A1* | 10/2013 | Guiset | .................... | F24C 7/083 362/23.1 |
| 2013/0328946 A1* | 12/2013 | Zenker | ...................... | G09F 9/35 345/690 |
| 2014/0009370 A1* | 1/2014 | Weiss | ...................... | F24C 7/082 345/32 |
| 2014/0146530 A1* | 5/2014 | Guiset | .................... | G09F 9/33 362/230 |
| 2014/0146538 A1* | 5/2014 | Zenker | ..................... | F21V 9/40 362/293 |
| 2014/0305929 A1 | 10/2014 | Weiss et al. | | |
| 2015/0021312 A1* | 1/2015 | Zenker | ..................... | F24C 7/083 219/445.1 |
| 2015/0111717 A1* | 4/2015 | Gabel | ..................... | C03C 3/087 501/32 |
| 2015/0191391 A1* | 7/2015 | Sinapi | ..................... | C03C 15/00 428/156 |
| 2015/0217531 A1* | 8/2015 | Suess | ................... | B29C 45/2673 428/138 |
| 2016/0031755 A1* | 2/2016 | Hoppe | ................... | B41M 5/262 428/156 |
| 2016/0124262 A1* | 5/2016 | Wu | .................... | G02F 1/133512 349/110 |
| 2016/0252656 A1* | 9/2016 | Waldschmidt | ............ | C03C 3/00 362/259 |
| 2016/0258631 A1* | 9/2016 | Aihara | .................... | F24C 15/10 |
| 2016/0281961 A1* | 9/2016 | Laluet | ................. | C03C 10/0027 |
| 2017/0016627 A1* | 1/2017 | Charpentier | ........ | C03C 10/0027 |
| 2017/0016628 A1* | 1/2017 | Charpentier | ............ | F24C 7/083 |
| 2017/0023260 A1* | 1/2017 | Charpentier | ........ | C03C 10/0027 |

FOREIGN PATENT DOCUMENTS

| | | | | |
|---|---|---|---|---|
| DE | 4320341 A1 * | 12/1994 | ........ | B08B 7/0042 |
| DE | 19823257 A1 * | 2/2000 | ........ | C03C 14/006 |
| DE | 19841547 A1 * | 3/2000 | ........ | C03C 14/006 |
| DE | 19939787 A1 * | 2/2001 | ........ | C03C 10/0027 |
| DE | 10162111 A1 * | 6/2003 | ........ | B41M 5/262 |
| DE | 10347763 A1 * | 5/2005 | ........ | F24C 15/04 |
| DE | 202004015925 U1 * | 11/2005 | ........ | B32B 17/06 |
| DE | 202006004064 U1 * | 7/2006 | ........ | B44C 1/22 |
| DE | 102005043516 A1 * | 3/2007 | ........ | B41M 5/262 |
| DE | 102006017250 A1 * | 10/2007 | ........ | B44C 5/0407 |
| DE | 102008031426 A1 | 1/2010 | | |
| DE | 102008031428 A1 | 1/2010 | | |
| DE | 102012103507 A1 | 10/2013 | | |
| DE | 102013103776 A1 | 6/2014 | | |
| DE | 102013103774 | 10/2014 | | |
| EP | 0114565 A1 * | 8/1984 | ........ | G04B 19/10 |
| EP | 0868960 B1 | 9/1999 | | |
| EP | 0959051 | 11/1999 | | |
| EP | 1548692 A2 * | 6/2005 | ........ | G09F 13/04 |
| EP | 2072478 A1 * | 6/2009 | ........ | C03C 23/0025 |
| EP | 2085702 A2 * | 8/2009 | ........ | F24C 15/10 |
| EP | 2236312 A2 * | 10/2010 | ........ | B41M 5/262 |
| EP | 2251608 A2 * | 11/2010 | ........ | F24C 15/10 |
| EP | 2559514 A1 * | 2/2013 | ........ | C03C 23/0025 |
| EP | 2573204 | 3/2013 | | |
| EP | 2687493 | 1/2014 | | |
| EP | 2687785 A1 * | 1/2014 | ........ | F24C 7/083 |
| EP | 2757319 A1 * | 7/2014 | ........ | F24C 7/083 |
| EP | 2757321 A1 * | 7/2014 | ........ | F24C 15/102 |
| EP | 2805829 A1 | 11/2014 | | |
| FR | 2974767 A1 * | 11/2012 | ........ | B41M 5/24 |
| JP | 03122028 A * | 5/1991 | ........ | C03C 23/004 |
| JP | 2000310427 A * | 11/2000 | | |
| JP | 2003201149 A * | 7/2003 | | |
| JP | 2004352562 A * | 12/2004 | ........ | C03C 21/005 |
| JP | 2006125645 A * | 5/2006 | | |
| JP | 2007170754 A * | 7/2007 | ........ | C03C 3/097 |
| JP | 2008239405 A * | 10/2008 | | |
| JP | 2008267633 A * | 11/2008 | | |
| JP | 2010153229 A * | 7/2010 | | |
| JP | 2012226850 A * | 11/2012 | | |
| JP | 2014092323 A * | 5/2014 | | |
| JP | 2014137948 A * | 7/2014 | | |
| JP | 2014215018 A * | 11/2014 | | |
| WO | 03020527 | 3/2003 | | |
| WO | WO-2008128900 A2 * | 10/2008 | ........ | F24C 7/082 |
| WO | WO-2010037802 A1 * | 4/2010 | ........ | C03B 23/203 |
| WO | WO-2010081637 A1 * | 7/2010 | ........ | A61F 2/0036 |
| WO | 2011006773 A1 | 1/2011 | | |
| WO | 2011020721 A1 | 2/2011 | | |
| WO | WO-2011020721 A1 * | 2/2011 | ........ | C03C 17/06 |
| WO | WO-2012073153 A1 * | 6/2012 | ........ | C03B 32/02 |
| WO | WO-2012085821 A1 * | 6/2012 | ........ | C03C 17/36 |
| WO | WO-2013084120 A1 * | 6/2013 | ........ | F24C 15/102 |
| WO | 2014170275 | 10/2014 | | |
| WO | 2015044168 A1 | 4/2015 | | |
| WO | WO-2015150960 A1 * | 10/2015 | ........ | F24C 15/06 |

OTHER PUBLICATIONS

Machine Translation of WO 2011020721 A1, Feb. 2011 (Year: 2011).*
Machine Translation of WO 2012085821 A1, Jun. 2012 (Year: 2012).*
Machine Translation of EP 2757319 A1, Jan. 2014 (Year: 2014).*
Machine Translation of WO 2015150960 A1, Oct. 2015 (Year: 2015).*
Machine Translation of JP 2010153229 A, Jul. 2010 (Year: 2010).*

* cited by examiner

METHOD FOR PRODUCING A GLASS CERAMIC ELEMENT WITH PATTERNED COATING

This application claims benefit under 35 U.S.C. § 119(a) of German Patent Application No. 10 2014 118 497.1 filed Dec. 12, 2014 and German Patent Application No. 10 2015 103 518.9 filed Mar. 10, 2015, the entire contents of both of which are incorporated herein by reference.

BACKGROUND OF THE INVENTION

1. Field of the Invention

The invention generally relates to glass ceramic articles that are provided with patterned coatings. More particularly the invention relates to glass ceramic articles which have translucent features in coatings.

2. Background of the Invention

From the prior art, glass ceramic cooktops are known which are coated on the lower surface in order to modify the appearance and to conceal parts of the cooktop installed below the glass ceramic.

One option for this purpose are sol-gel coatings which are quite heat resistant and are distinguished by good adhesion to the glass ceramic plate. For concealing internal parts of a cooktop, opaque coatings are typically used.

For some applications it is desirable that the coating does not cover the entire surface but has windows. Such windows are in particular arranged in front of light emitting display elements, so that these display elements shine through the glass ceramic plate to be visible to an operator which looks at the utilization side of the cooktop. Partly, these windows are covered by translucent coatings to improve aesthetic appearance. With the same hue, a homogeneous surface is created in this manner.

Nowadays, icons, characters, or other logos and designs are printed on cooktops by screen printing. However, it is difficult to produce very fine patterns such as thin lines, for example.

Moreover, when very fine or small logos are to be produced the ink tends to smear, causing rejects. Furthermore, for every new product request or design change a new screen needs to be created, so that set-up costs are very high, which is especially noticeable in small series. Manufacturing of individual designs for each end user is therefore expensive.

Furthermore, for multilayer coatings in case of a printing technique such as screen printing the problem arises that congruent patterning is difficult. Therefore, in case of multilayer coatings usually a larger window is omitted, to allow to pattern a further coating layer with exactly the desired pattern in the area of the window. However, especially in combination with light emitting display elements the window might be visible if the more precisely patterned coating layer is not completely opaque.

EP 0 868 960 B1 discloses a process for manufacturing control panels, in particular for electrical household appliances, wherein at least one personalized laser engraving is produced in at least one screen printing layer which has previously been applied to a basic panel blank, the engraving consisting in material removal so as to form decorative features, icons, or similar signs in the screen printing layer, and then these engravings are covered by manually or automatically applying a layer of different color, which may be effected immediately after the engraving step or in a separate operation. Again, in this example, a plurality of layers are applied, and the laser engraving is performed between the coating steps. However, in terms of workflow it would be desirable to combine the coating process steps.

SUMMARY

The invention is based on the object to improve the creation of patterned coatings on glass ceramic substrates so as to provide for more flexibility in patterning and to be able to produce finer patterns than is possible with screen printing. In addition, with screen printing only the coating itself is patterned. However, it may be desired to additionally modify the glass ceramic in the portions of the glass ceramic element that remain uncoated.

A basic idea of the invention is to use a laser to remove coating portions from a coating previously applied on a glass ceramic article, in a later processing step. In this case, the exposed glass ceramic itself may then be modified by means of the laser, to have more options to modify the design and the optical properties of the glass ceramic.

For concealing the display elements or other technical items below the glass ceramic in the region of the window or pattern feature, a translucent coating may be used according to one embodiment. Alternatively, a translucent film matched in color may be inserted between light emitting elements and the windows or pattern feature in the glass ceramic. This achieves both, visibility of the display element and a homogeneous aesthetic appearance for the operator looking at the utilization side of the cooktop.

BRIEF DESCRIPTION OF THE DRAWINGS

The invention will now be described in more detail with reference to the accompanying figures. In the figures, the same reference numerals designate the same or similar elements. In the drawings.

DETAILED DESCRIPTION

Figure 1:
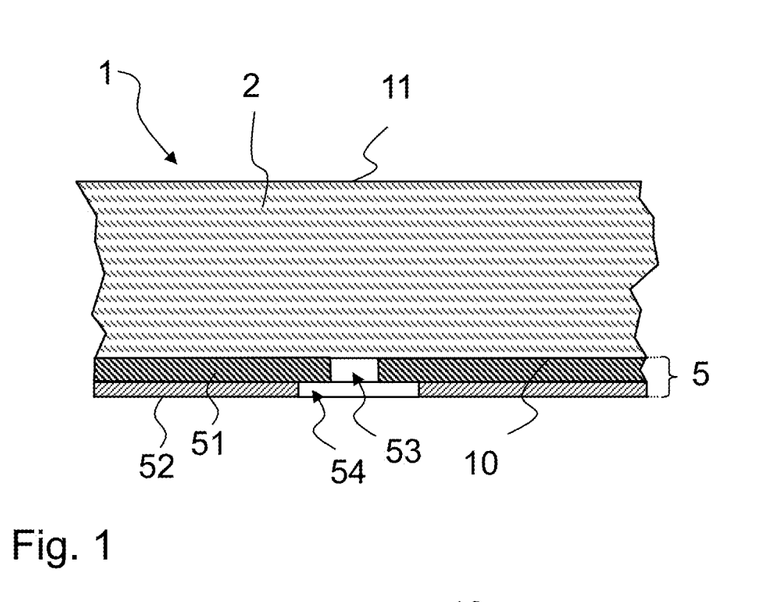
FIG. 1 shows a patterned multilayer coating on a glass ceramic element according to the prior art.

For a more detailed description of a glass ceramic element 1 that is provided with a patterned coating, reference is first made to the example of FIG. 1 which comprises a coating 5 produced by conventional screen printing. The plate-shaped glass ceramic element 1 has two opposite faces 10, 11. In case of a glass ceramic element in the form of a glass ceramic cooking plate, one of the faces 10, 11 is the utilization side.

The coating 5 on at least one of faces 10, 11 is a multilayer coating consisting of a first ink layer 51 on the glass ceramic 2 and a second ink layer 52 applied to the first ink layer 51. First ink layer 51 includes a pattern feature 53. This pattern feature is defined by a region in which the glass ceramic 2 remains free, that means it is not coated there. The contour of this pattern feature may, for example, take the shape of a logo, lettering, or an icon. Due to the patterned discontinuity of the ink layer, light can pass through the glass ceramic element 1 across the pattern feature and glass ceramic 2. The individual layers of coating 5 are applied sequentially. A problem that arises here is that it is not readily possible to exactly align the contour of pattern feature 53 in the subsequent, second ink layer 52 with the pattern feature 53 in the first ink layer. Therefore, instead of a pattern feature, a larger area in the form of a window 54 or undercut with respect to pattern feature 53 is omitted in the second ink layer 52 which may additionally serve as a sealing layer.

This is disadvantageous, since in the region of window 54 the layer thickness of coating 5 is reduced to the thickness of the first ink layer 51. Thus, unless the first ink layer is completely opaque, light can penetrate through the glass ceramic 2 in the region of the window. Therefore, when pattern feature 53 is backlighted the window will be visible. Moreover, there is a limit for the smallest feature sizes achievable by screen printing.

Figure 2:
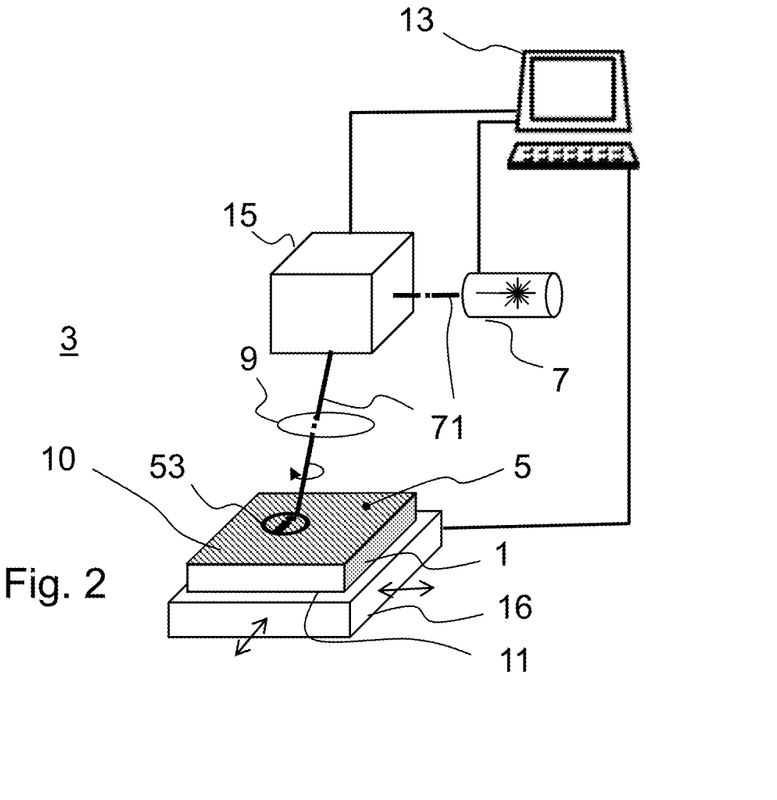
FIG. 2 shows an apparatus for performing the method according to the invention.

FIG. 2 now shows an apparatus 3 for performing the method of the invention, i.e. a method for producing a glass ceramic element with a patterned coating.

Apparatus 3 comprises a laser 7 and means for directing a laser beam 71 generated by laser 7 over the surface of a glass ceramic element 1 that has been coated with a coating 5. For instance a galvanometer scanner 15 may be used as the means for directing the laser beam 71 over the surface.

As shown in FIG. 2, alternatively or in addition to a galvanometer scanner, means for moving the glass ceramic element 1 may be provided. Particularly suitable for this purpose is an X-Y table 16, also referred to as a cross table. In such an embodiment, the laser beam 71 can be fixed and the pattern feature may be introduced into the coating 5 with the desired shape by moving the X-Y table with the glass ceramic element 1 arranged thereon.

For focusing the laser beam 71 on the surface in order to achieve the highest possible intensity, an appropriate focusing optical system 9 may be provided. In the example shown in FIG. 2, this focusing optical system is arranged downstream of galvanometer scanner 15. However, it will be apparent to those skilled in the art that other configurations are likewise possible, which are suitable to focus the laser beam 71 onto glass ceramic element 1. In order to achieve short focal lengths, it is favorable to arrange the focusing optical system behind the galvanometer as seen in the beam direction. Generally, regardless of the specific configuration of the optical system and the displacement mechanism as shown in the example of FIG. 2, a focusing optical system, in particular a lens or group of lenses or a focusing mirror with a focal length of less than 250 mm is preferred. A focal length of less than 100 mm is particularly preferred.

To locally remove the coating 5 in order to produce a pattern feature 53 that interrupts coating 5, the laser beam 71 is moved over the surface by the laser beam directing means, and laser 7 is adjusted so that the ablation threshold of the material of coating 5 is exceeded and therefore the coating is removed at the point of incidence. However, in this case, the laser power is set so as to not reach the ablation threshold of the substrate material, so that only the coating/ink is removed. As an example, the glass ceramic marketed under the name ROBAX® may be mentioned. For this glass ceramic, the ablation threshold is $5.2*10^{17}$ W/m², for a laser wavelength of 1064 nm.

In the example shown in FIG. 2, coating 5 was removed in a manner so that an information icon is obtained as a pattern feature 53.

The laser beam directing means are controlled by a control unit 13 which may for instance execute a program that translates the shape and location of the pattern feature into control signals by means of which the laser beam 71 is moved over the surface by the laser beam directing means. Preferably, the control unit also controls the laser 7, in particular with regard to switching on and off and laser intensity.

According to the invention, not only the coating 5 is removed. Rather, the glass ceramic 2 of glass ceramic element 1 is additionally locally modified. In particular, this modification is of a nature so that the optical properties of glass ceramic 2 are altered.

Such a modification may comprise: volume-coloring of the glass ceramic, or, more generally, a change in absorption of the glass ceramic; introducing of light-scattering defects into the glass ceramic; or ablating and roughening or dulling of the surface of the glass ceramic exposed in the pattern feature.

In summary, the inventive method is thus based on the steps of: providing a glass ceramic element 1 with a coating that is at least partially light-blocking and preferably opaque in the visible spectral range; irradiating the glass ceramic element 1 with a pulsed laser beam, so that the coating 5 is removed by ablation and the glass ceramic is preferably exposed; wherein during irradiating the laser beam is directed over the surface of the glass ceramic element 1 so that a portion of the coating 5 is removed; and once the coating 5 has been removed, irradiating the glass ceramic with the same laser 7 in the region where the coating 5 has been removed, thereby optically modifying the glass ceramic in the irradiated region.

The portion of the coating, which is removed, may have a greater lateral dimension than the diameter of the laser beam. A line-shaped region with a width not greater than the diameter of the laser beam also has a greater longitudinal dimension.

The irradiating of the glass ceramic element 1 with a pulsed laser beam is particularly preferably performed at the surface or side on which the coating 5 is provided, like in the example shown in FIG. 2. However, if desired, the ablation of the coating may also be accomplished by directing the laser beam through the glass ceramic onto the coating 5. In other words, glass ceramic element 1 will be irradiated from the side opposite to the surface provided with the coating 5 in this case, and the laser beam will cross the glass ceramic and will be incident at the interface between glass ceramic and coating 5.

Optionally, another coating layer such as a transparent barrier layer may be provided below coating 5. In this case, the glass ceramic may be exposed to this further coating layer, and either the further coating layer is also removed or it is left in the area cleared from the opaque coating 5.

Laser 7 is preferably operated in a pulsed mode to provide high intensities for the ablation of the material of coating 5. Particularly suitable is an irradiation with laser pulses of pulse durations in the picosecond range, i.e. of a maximum of 1000 ps or less. Preferably, the pulse length is less than 200 ps, more preferably less than 20 ps in order to achieve high power densities. In particular during optical modification of the glass ceramic after the coating has been removed, especially for coloring or lowering transmittance, even shorter pulses in the femtosecond range or with pulse lengths of less than 1 ps may be used.

According to one embodiment of the invention, the glass ceramic element 1 is irradiated with laser pulses of a single pulse energy in a range from 5 to 200 microjoules (μJ) per pulse, preferably 5 to 100 μJ per pulse. Suitable for this purpose is a picosecond pulsed laser with an output power from 8 to 10 W, for example.

Particularly suitable are lasers having shorter wavelengths, in order to remove coating 5 by ablation on the one hand, and to optically modify the glass ceramic on the other hand. Therefore, laser radiation having a wavelength of less than 800 nm is particularly preferred. Accordingly, the laser radiation is in the visible or ultraviolet spectral range. Such wavelengths enable both, ablation of coating 5 and modification of the optical properties of the glass ceramic within the volume thereof.

According to one exemplary embodiment, a frequency-doubled picosecond pulsed Nd:YAG laser may be employed as the laser 7. Experiments were performed with such a laser with an output power of 8 W and a pulse length of 10 ps.

Figure 3:
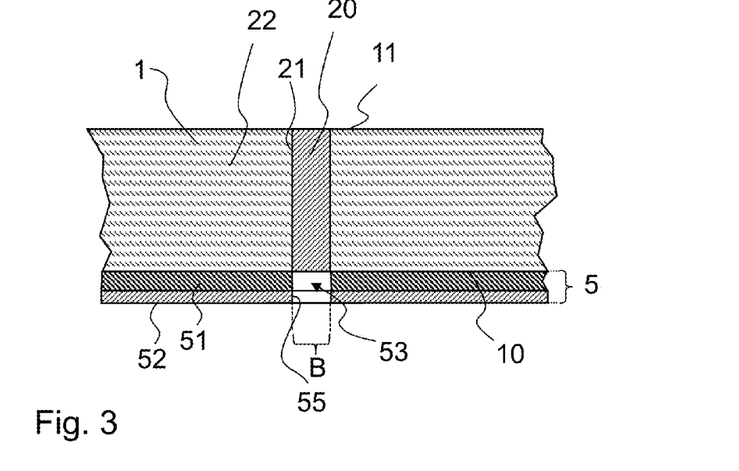
FIG. 3 shows a glass ceramic element processed by the method of the invention.

FIG. 3 schematically shows a glass ceramic element 1 that has been processed by the method of the invention for producing a patterned coating 5.

Here again, like in the example shown in FIG. 1, a multilayer coating 5 with two ink layers 51, 52 is provided. The ablating operation creates a pattern feature 53 in the form of a region in which the coating 5 has been removed, and in this case the contours of the removed portions of the individual ink layers 51, 52 are congruent. The individual layers of coating 5 need not all be ink layers. Therefore, according to one embodiment it is generally contemplated that the coating 5 comprises a plurality of layers 51, 52 and that the contour 55 of the pattern feature 53 of the coating 5 as formed by removing or local absence of coating 5 exhibits congruent edges of the removed portions of the layers 51, 52.

In addition, as mentioned above, a region 20 of the glass ceramic 2 is optically modified by the laser irradiation. Generally, first the coating 5 is removed so that it no longer blocks the laser radiation which can then penetrate into the glass ceramic 2. The intense laser radiation then modifies the optical properties of glass ceramic 2.

In the example shown in FIG. 3, as is preferred, the optical properties of glass ceramic 2 are modified in the volume thereof. Thus, according to this embodiment, region 20 is a volume portion of the glass ceramic 2 of glass ceramic element 1. The modification of optical properties of glass ceramic 2 is effected across pattern feature 53, i.e. through the ablated portion in coating 5. In this manner, the contour 21 of modified region 20 can be adjusted to exactly conform to the contour 55 of pattern feature 53. This means that the contour 21 of optically modified portion 20 will be substantially congruent with the contour of pattern feature 53, at least in sections thereof. Here, substantially congruent means that the contour is completely congruent to the shape of the contour 55 of pattern feature 53 or offset by not more than 5 μm. Such slight offsets may be caused by scattering, diffraction, or shadowing effects on the contour 55 of pattern feature 53, for example. In any case, the invention permits to very accurately and very easily align optically modified regions of a glass ceramic with pattern features in the form of light-transmissive apertures in an otherwise light-blocking coating 5 on the glass ceramic.

Furthermore, glass ceramic 2 is monolithic, because the modification is effected subsequently. This means that there are no joints between the optically modified region 20 and adjacent regions 22. In particular the contour 21 of the optically modified region 20 is not defined by a joint.

Accordingly, with the method of the invention a glass ceramic element 1 with a coating 5 is provided, which comprises the following features: the glass ceramic element is preferably plate-shaped and has two opposite faces 10, 11; a coating 5 which is at least partially light-blocking and preferably opaque in the visible spectral range is applied on the glass ceramic 2, preferably on one of the faces 10, 11; a portion of coating 5 has been removed, namely the portion of pattern feature 53; and the glass ceramic 2 of glass ceramic element 1 includes a first region 20 having optical properties that have been modified relative to the optical properties of adjacent regions 22, wherein a contour 21 or edge of the first region 20 is congruent with a contour 55 of the region in which the coating 5 has been removed, at least in sections thereof, so that in the congruent sections the shape of the contour of the first region is offset by not more than 20 μm, preferably by not more than 5 μm to the shape of the contour 55 of pattern feature 53, and wherein the first region 20 and adjacent regions are monolithic so that the first region 20 and the one or more adjacent regions 22 merge into each other without joint.

Even in case of black or dark colored glass ceramics, a so-called light-diffusing cover layer is optionally applied to the lower surface, in order to prevent the user from seeing the inside of the cooktop from above. Such a coating is usually also applied by screen printing. The lower surface of the glass ceramic plate usually has a knobbed texture, in order to increase the strength of the glass ceramic. Due to the knobbed texture it is difficult to print fine characters in this layer, which is caused by the uneven surface due to the mountains and valleys of the knobbed surface. The unevenness results in a smeared appearance of a printed edge. When such a light-diffusing cover layer is locally removed in a later processing step, this could also allow to produce fine characters in the future.

The method of the invention, by contrast, permits to produce very fine pattern features 53. Generally, without limitation to the illustrated example, the pattern features 53 produced in form of regions in which the coating has been removed, may have a width B (i.e. the spacing between opposed contour lines) of less than 450 μm, preferably less than 300 μm, more preferably less than 250 μm, at least in sections thereof. Even feature sizes of 120 μm and less, or even 100 μm and less are possible.

As mentioned above, the method is also particularly suitable for locally removing a coating 5 on a knobbed face of a glass ceramic element 1 and for producing corresponding pattern features.

According to one embodiment of the invention, the optical modification of the glass ceramic comprises reducing light transmittance of the glass ceramic induced by the irradiation with the laser 7. Thus, according to this embodiment of the invention, light transmittance of the first region 20 is lower than that of adjacent regions 22. The method for reducing transmittance by laser irradiation is described in more detail in German patent application DE 10 2013 110 576.9. The content of DE 10 2013 110 576.9 with respect to the reduction of transmittance of a glass ceramic is hereby fully incorporated by reference into the subject matter of the present application. Generally it is preferred in this case that during irradiation of the glass ceramic the laser intensity remains below the ablation threshold of the glass ceramic.

With such local coloration it is possible, for example, to produce a so-called "dead-front" effect, in particular in case of dark appearing coatings. Laser intensity is chosen so that the coloring of the glass ceramic 2 is modified in the form of a reduction of transmittance. These settings can then be used to first remove the screen printing ink and subsequently to alter the color of the so exposed substrate material, provided that the light intensity exceeds the ablation threshold of the coating 5. Appropriate single pulse energies are in a range from 5 to 200 µJ per pulse.

According to one embodiment of the invention, integral light transmittance in the visible spectral range (380 nm to 780 nm) of the glass ceramic is reduced in the irradiated region 20 compared to the non-irradiated region 22 by at least 2%, preferably by at least 3.5%, and more preferably at least 5%.

If, as in the illustrated example shown in FIG. 3, the glass ceramic element 1 is employed as a cooking plate, in which case the coating 5 is applied on the lower surface and the glass ceramic exhibits rather high transmittance, pattern feature 53 would be visible when looking from the side 11. With the darkening of the first region 20, the color of glass ceramic 2 is matched at least partially with the hue caused by the coating 5 on the lower surface, so that pattern feature 53 becomes visually less conspicuous. If a pattern feature is introduced into the coating 5 for the purpose of arranging a light emitting display element below, which is visible from the side 11, light transmittance of the first region 20 is preferably only lowered to an extent so that the light is still well visible through region 20.

In order to achieve such reduction of light transmittance, it is favorable if the glass ceramic contains metal ions as coloring components, which are converted into coloring constituents by the laser radiation. In one embodiment of the invention, the glass ceramic comprises at least one of the following elements: titanium, tin, iron, vanadium, chromium, cerium, neodymium, europium, manganese, cobalt, nickel, zinc, arsenic, antimony, copper, silver, and/or gold.

According to one advantageous embodiment of the invention, integral light transmittance is reduced in the entire visible spectral range. In particular, the reduction of light transmittance is achieved uniformly over the entire visible spectral range so that the irradiated regions have a gray color. Therefore, glasses that have been treated with the method according to the present invention differ from glasses or glass ceramics colorized by solarisation effects, which usually exhibit a pronounced reduction in transmittance in the UV range and a visible brown coloring.

The composition of the glass ceramic has an influence on the degree of colorization. A gray or gray-bluish shading such as described above may for instance be obtained by irradiation of titanium-containing glass ceramics.

This is advantageous since in this way the irradiated regions will appear darker to a viewer, while the color appearance remains largely unchanged. In particular it is for instance possible in this way to shade or darken light sources such as LEDs which shine through the regions that have been irradiated, while the color appearance for a viewer will not be altered, or not appreciably.

In particular, according to one embodiment of the invention the difference in transmittances, $(\tau_1-\tau_2)/(\tau_1+\tau_2)$, wherein $\tau_1$ is the transmittance of the first region for a specific wavelength and $\tau_2$ is the transmittance of the second region for this wavelength, is substantially constant for a range of wavelengths over the visible spectral range. This means that the difference in transmittances, $(\tau_1(\lambda)-\tau_2(\lambda))/(\tau_1(\lambda)+\tau_2(\lambda))$, with $\tau_1$ being the transmittance of the region 20 treated according to the invention for a specific wavelength and $\tau_2$ being the transmittance of the non-irradiated region for this wavelength, varies by not more than 30%, preferably not more than 20% with respect to the average value of this difference in transmittances for a variation in wavelength over the visible spectral range, preferably in a spectral range from 400 nm to 780 nm.

The effect of lowered transmittance in the treated first region 20 is based on an increase of the absorption coefficient of the glass ceramic induced by the laser irradiation. Therefore, a relationship similar to the above given variation of the wavelength-dependent difference in transmittances applies to the spectral or wavelength-dependent absorption coefficient $\alpha(\lambda)$. Therefore, according to one embodiment of the invention it can be stated that for the wavelength-dependent absorption coefficients $\alpha_1(\lambda)$ (absorption coefficient of the first, irradiated region 20), and $\alpha_2(\lambda)$ (absorption coefficient of the second, adjacent region 22) the difference $(\alpha_1(\lambda)-\alpha_2(\lambda))/(\alpha_1(\lambda)+\alpha_2(\lambda))$ in a range of wavelengths from 400 nm to 780 nm also varies by not more than 30%, preferably not more than 20% with respect to the average value of this difference in the mentioned range of wavelengths.

Figure 4:
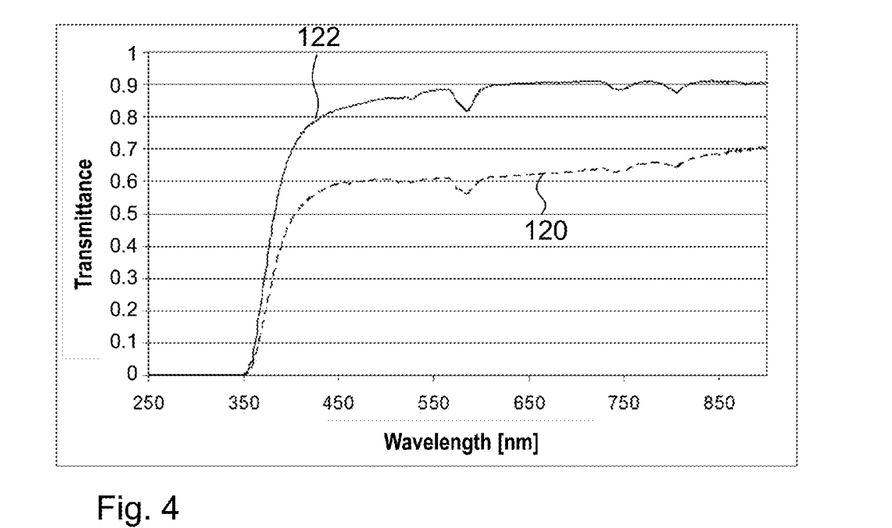
FIG. 4 shows transmittance spectra of a region darkened by laser irradiation and of an adjacent non-darkened region.

FIG. 4 shows spectral transmittances of a transparent glass ceramic plate of 4 mm thickness treated according to the invention, as a function of wavelength. Curve 120 in FIG. 4 represents the spectral transmittance of a region 20 treated according to the invention, curve 122 represents the spectral transmittance of an adjacent, non-treated region 22.

From the two curves it can be seen that in the treated region 20 transmittance is lower over the entire visible spectral range than in the region 22 not irradiated by the laser, and that the difference in transmittances between the first and the second region is relatively constant across the entire visible spectral range.

This is advantageous if the intension is not so much to alter the hue but to reduce translucency, for example to selectively darken regions of the glass or glass ceramic element. Therefore, according to one embodiment of the invention and without limitation to the specific exemplary embodiment, spectral transmittance in the first region is lower than in an adjacent second region within the entire spectral range between 400 nm and 780 nm.

Figure 5:
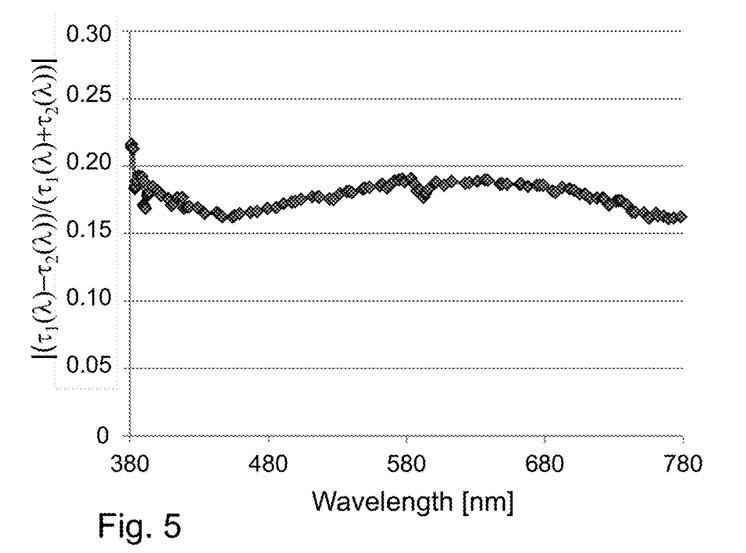
FIG. 5 illustrates the relative difference in the transmittance spectra shown in FIG. 4.

FIG. 5 shows the difference $(\tau_1-\tau_2)/(\tau_1+\tau_2)$ of the two curves $\tau_1(\lambda)$, $\tau_2(\lambda)$ of FIG. 4 for the visible spectral range of wavelengths between 400 nm and 780 nm. As can be seen from the figure, the difference varies only slightly over the illustrated spectral range. The mean value of the difference, i.e. the average of values $(\tau_1-\tau_2)/(\tau_1+\tau_2)$ for all wavelengths in the range from 400 nm to 780 nm is 0.177 in this example. The maximum variation, i.e. the difference between the maximum value and the minimum value of this difference is 0.0296 in the illustrated example. The resultant variation of the difference with respect to the average value thereof is 0.0296/0.177=0.167, or 16.7%. Thus, the variation here is only slightly less than 17% with respect to the average value.

In the method described above in which the transmittance of the glass ceramic 2 is lowered, there is no need to focus the laser beam 71 on a point within the material. In order to achieve a modification of transmittance spread in the volume of glass ceramic element 1 or a volume coloring in the irradiated region, it suffice to select a focus plane of the laser outside the material thickness.

Figure 6:
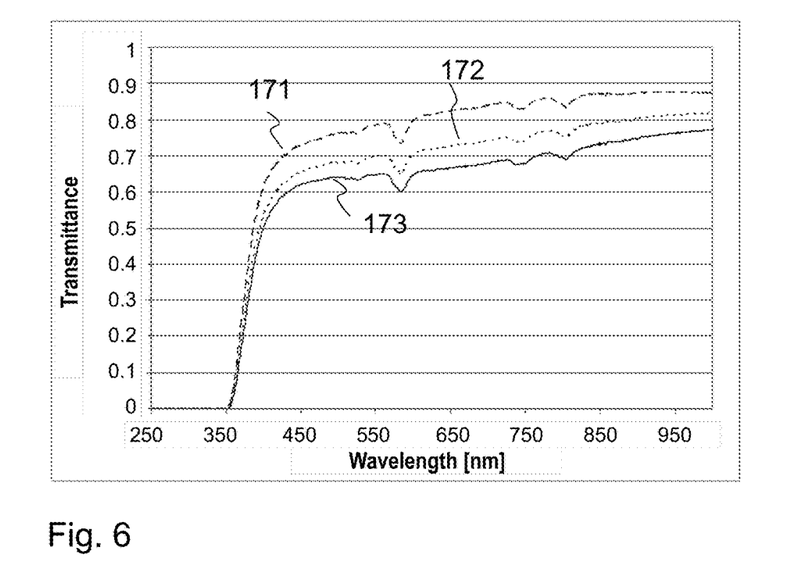
FIG. 6 shows transmittance spectra for different distances of the focus plane of the laser to the glass ceramic element.

For illustration purposes, FIG. 6 shows transmittance spectra of a further exemplary embodiment as a function of the selected distance of the laser focus to the surface of glass ceramic element 1. In this exemplary embodiment, the workpiece is a transparent glass ceramic plate with a thickness of 4 mm. Curves 171, 172, and 173 show transmittance spectra of different irradiated regions, and each region was irradiated with a different focal distance. Curve 171 shows the transmittance spectrum of an irradiated region for which during irradiation the distance of the focus from the surface of the glass ceramic was greater than during the irradiation of the regions represented by the transmission spectra of curves 172 and 173. FIG. 6 shows that with a smaller focal distance the reduction of transmittance is intensified, i.e. the intensity of colorization increases the closer the focus of the laser is placed to the surface of the glass ceramic or, more generally, of the workpiece, since power density of the laser is also increased in this way.

Therefore, according to one embodiment of the invention it is contemplated that once the coating 5 has been removed, the focus plane is placed above or below the surface of the provided glass ceramic element 1. A distance between the focus plane of the laser 7 relative to the surface of glass ceramic element 1 in a range from 2 mm to 10 mm, in particular in a range from 4 mm to 8 mm has proved to be particularly advantageous. According to one embodiment of the invention, for producing a darkening in the entire volume of the irradiated region 20, only raster scanning of the surface is necessary, but not raster scanning of the depth.

Especially in order to achieve a more significant reduction in transmittance it is contemplated according to yet another embodiment of the invention to repeatedly scan the irradiated region 20 with different positions of the focus. However, preferably in this case the focus is always in the volume of the glass ceramic. It has proved to be favorable to choose a spacing of the focus planes in a range from 100 µm to 1000 µm. If, for instance, planes in steps of 400 µm are raster scanned, seven scanning planes are resulting for a thickness of the glass ceramic of 4 mm.

The location of the focal point, in particular the distance between the focus plane and the surface of the ceramic element 1 may however be changed during the scanning operation, according to another embodiment, for example in order to increase homogeneity of transmittance reduction within the irradiated volume, or to obtain three-dimensional effects. Thus, the focal point may be above or below the workpiece, i.e. glass ceramic element 1. By the positioning of the laser focus (above or below glass ceramic element 1) and by the distance of the focal point from the surface of the glass ceramic element 1, the intensity of darkening or of the change in transmittance can be influenced. For example, with a focal point below the glass ceramic element 1 the intensity of darkening is greater than with a corresponding focus of the same size above the glass ceramic element 1. In this manner, coloration or darkening can be produced in different intensities by varying the power density or altering the distance of the focus across the thickness of the workpiece during irradiation. This permits to produce, for example, three-dimensional optical effects in the glass ceramic element 1.

There is no need in this case to focus the laser to a point in the material. In order to achieve a modification of transmittance spread in the volume of glass ceramic element 1 or a volume coloration in the irradiated region, it suffice to select a focal plane of the laser outside the material thickness.

Therefore, according to one embodiment of the invention it is contemplated that in particular for lowering transmittance of the glass ceramic, the focus plane is placed above or below the surface of glass ceramic element 1. A distance of the focus plane of laser 7 relative to the surface of glass ceramic element 1 in a range from 2 mm to 10 mm, in particular in a range from 4 mm to 8 mm has proved to be particularly advantageous for lowering the transmittance of the glass ceramic 2 in order to achieve a coloration or darkening spread across glass ceramic element 1.

The reduction of transmittance described above does not or not significantly increase light scattering, that means it is not caused by defects in the glass ceramic.

In one embodiment, light scattering in the first region 20 of the glass or glass ceramic is stronger by at most 20 percentage points, preferably by not more than 10 percentage points, more preferably not more than 5 percentage points, most preferably not more than 1 percentage point compared to light scattering in adjacent, second regions of the glass ceramic. Thus, light scattering in regions 20, 22 remains substantially unchanged. The upper limit of light scattering being stronger by at most 20 percentage points also applies to the case that light scattering in the first region 20 is lower than in the adjacent second regions 22. Given this marginal increase in light scattering, if any, there will be no visible effect. Light scattering is the fraction of total incident intensity minus the directly transmitted light, Fresnel reflection, and absorption. The increase in scattering given in percentage points refers to the proportion of scattered light during transmission of a light beam. If, for example, the proportion of scattered light intensity in the second region is 3% of the total intensity, an increase by 5 percentage points in the first region then means a proportion of scattered light intensity in the first region of 3%+5%=8%. The terms transmission, scattering, absorption, and remission as used in the context of the invention are in conformity to the definitions according to DIN 5036-1 and can be determined with the measurement rules according to ISO 15368.

According to yet another embodiment of the invention, it is also possible, after ablation of the coating, to increase the transmittance of the glass ceramic which is a volume-colored glass ceramic in this case, during irradiation. The method for increasing transmittance is described in more detail in European patent application EP 2 805 829 the content of which with respect to the laser-induced increase in transmittance or decrease of the absorption coefficient is hereby fully incorporated by reference into the present application.

Therefore, according to one embodiment of the invention it is contemplated that, once the coating 5 has been removed, the glass ceramic which is volume-colored by coloring metal ions is irradiated by means of laser 7 in the region where the coating 5 has been removed, thereby optically modifying the glass ceramic in the irradiated region by decreasing the absorption coefficient. In particular this is made possible by choosing the power density of the laser light so that the irradiated region of the glass ceramic plate is locally heated, wherein heating continues at least until the transmittance of the glass ceramic material is increased in the volume of the heated region in at least one spectral range within the visible spectral range of light wavelengths between 380 nanometers and 780 nanometers; and when heating is completed, the irradiation of laser light is terminated and the irradiated region is allowed to cool.

For the example shown in FIG. 3, therefore, the optically modified region 20 will thereafter exhibit higher transmittance in the visible spectral range than the surrounding glass ceramic material. This embodiment of the invention may as well be combined with other embodiments with respect to an optical modification of the glass ceramic. It is conceivable, for example, to treat one region so as to increase transmittance and another region so as to lower transmittance. For instance, a first region may be darkened by means of ultra-short pulses without substantially heating up, another region may be locally heated by changing the irradiation parameters, e.g. by switching to another wavelength and/or switching to CW operation, so that light transmittance in the visible spectral range increases.

The coloring effect of these ions may also be dependent on an interaction with other constituents of the glass ceramic. That means, the coloration may be enhanced by interaction with other metal ions, or vice versa, may be attenuated. For example, manganese and iron ions exhibit interaction with tin and/or titanium, which is why preferably manganese or iron oxide is employed as a coloring agent preferably in combination with tin oxide and/or titanium oxide in the composition. Coloring ions of rare earth elements, in particular cerium ions, interact with ions of chromium, nickel, and cobalt. Preferably, therefore, oxides of rare earth elements are employed as a coloring agent in combination with oxides of the above mentioned metals in the glass ceramic composition to achieve volume coloring. For vanadium, an interaction with tin, antimony, or titanium can be assumed as well.

Generally, without being limited to the specific exemplary embodiments, according to one embodiment the volume-colored glass ceramic includes ions of at least one of the following metals or combinations of ions of the following metals: vanadium, in particular in combination with tin and/or titanium; rare earth elements, in particular cerium, preferably in combination with chromium and/or nickel and/or cobalt; manganese, preferably in combination with tin and/or titanium; iron, preferably in combination with tin and/or titanium.

The method according to this embodiment of the invention is very suitable for locally attenuating the coloration of a glass ceramic article that is volume-colored by vanadium oxide. Accordingly in this case, transmittance in the visible spectral range between 380 nanometers and 780 nanometers is increased by heating. Therefore, according to a preferred refinement of this embodiment a glass ceramic element volume-colored by vanadium oxide is provided, in which integral light transmittance in the visible spectral range is increased in the first region 20 treated according to the invention as compared to an adjacent, second region 22 that has not been treated.

In this way, windows of higher transmittance may easily be produced in an otherwise dark appearing glass ceramic cooktop, for example. Below such a window, a display may then be mounted, and the light emitted by the display will be clearly visible for the viewer. A window as a particularly preferred form of a brightened region produced by the method according to the invention refers to a region which is surrounded along at least three edges thereof or at least along 50% of its periphery by adjacent non-brightened second regions. Preferably, the first region is completely surrounded by second regions or non-brightened glass ceramic material.

Vanadium oxide is a very strong coloring agent. Generally in this case, coloration is only accomplished during ceramizing. By appropriate laser irradiation onto the surface exposed by local ablation of the coating 5, a volume-coloration caused by vanadium oxide may be offset, at least partially. To obtain a clearly visible effect in case of a glass ceramic colored by vanadium oxide, it is therefore contemplated according to one embodiment of the invention, that the glass ceramic includes at least 0.005 percent by weight, preferably at least 0.01 percent by weight of vanadium oxide. This causes a sufficiently strong coloration and accordingly a significant modification in transmittance in the optically modified region 20.

According to another embodiment of the invention, once the coating has been removed, defects are produced within the glass ceramic in small dot-shaped volumes (typically much smaller than 1 mm$^3$) using a pulsed highly focused laser beam. A result of these defects are local reflection or scattering surfaces which cause incident light to be deflected, reflected, or scattered into all directions, resulting in a frosted glass effect. The glass locally becomes translucent. During this process, the focus of the laser beam is directed from point to point within the glass ceramic 2, so that 2- or 3-dimensionally extended patterns can be created. In the exemplary embodiment shown in FIG. 7, a region 20 in glass ceramic 2 has been optically modified by focusing the laser beam 71 in the interior of the glass ceramic 2 and generating local dot-like light scattering defects 23. Here, again, the optical properties are modified after a pattern feature 53 has been created by locally removing the coating 5. Again, as in the case of lowering transmittance, the laser beam 71 is irradiated into the glass ceramic 2 across the region where the coating 5 has been removed. Here, too, it is preferred that the lateral contour 21 of the optically modified first region 20 is at least partially congruent with the contour 55 of pattern feature 53, i.e. contour 55 of the region in which the coating 5 has been removed. For creating the defects 23 in the interior of glass ceramic 2, the focus of laser beam 71 is preferably set to a depth in a range from 500 to 2000 µm, more preferably to a depth in a range from 100 to 1500 µm below the surface of the glass ceramic. The strength of glass ceramic element 1 as measured with a falling ball test is not or not significantly affected by the defects 23 in the interior of glass ceramic 2.

Figure 7:
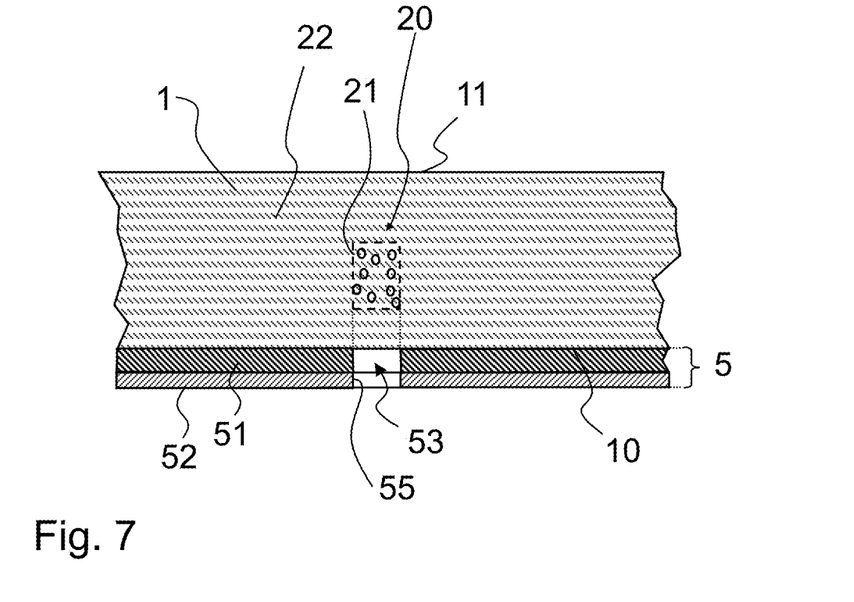
FIG. 7 shows an embodiment of a glass ceramic element that includes light-scattering defects.

This embodiment of the invention may be provided alternatively, but as well additionally to a reduction in light transmittance of the glass ceramic. For example, a first region 20 of lowered transmittance may include light scattering defects 23.

Figure 8:
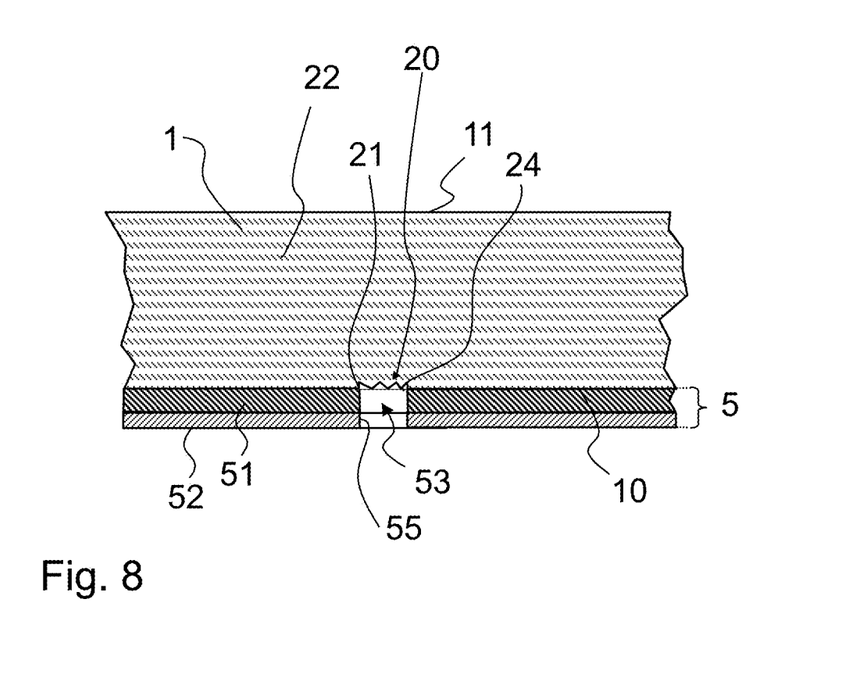
FIG. 8 shows another embodiment of a glass ceramic element processed by a laser.

According to yet another embodiment of the invention, the first region 20 may be optically modified by means of laser beam 71 by ablation of the glass ceramic on the surface. For this case, FIG. 8 shows another exemplary embodiment. In this exemplary embodiment, the first region 20 with modified optical properties of the glass ceramic comprises a matt surface area 24 at the surface of the glass ceramic in the region where the coating 5 has been removed.

To this end, laser intensity may be set so that the glass ceramic is also ablated, directly at the surface, after the coating 5 has been removed, so that a matt surface 24 is produced. Thus, no further process step is necessary. If necessary, laser intensity can be adapted to the generally differing ablation thresholds of coating 5 and glass ceramic 2.

In any case it is preferred that the defects resulting on the surface of the glass ceramic are as small as possible in order to affect the strength of glass ceramic element 1 as little as possible. For this purpose, a laser in the UV range of wavelengths is particularly suitable. In particular a laser of a wavelength of less than 360 nm is preferred.

According to one embodiment, pulse intensity is chosen in function of the way in which the glass ceramic element is optically modified. If, once the coating 5 has been removed, the surface of glass ceramic 2 is ablated, as in the example illustrated in FIG. 8, pulse intensity is chosen so that the ablation threshold of the glass ceramic is exceeded.

If the glass ceramic is optically modified by altering, in particular lowering, light transmittance of the glass ceramic by irradiation using laser 7, as in the examples shown in FIG. 3 to FIG. 6, pulse intensity (power per unit area) is preferably chosen so that the ablation threshold is not exceeded. Furthermore, the ablation threshold is usually a function of wavelength. As an example, the glass ceramic marketed under the name ROBAX® can be mentioned, for which the ablation threshold is $5.2*10^{15}$ W/m² for a laser wavelength of 1064 nm, and is $1.1*10^{16}$ W/m² for a laser wavelength of 532 nm. Notwithstanding the higher ablation threshold at a wavelength of 532 nm, the laser beam can be better focused, so that power loss is offset by frequency doubling and the higher ablation threshold. Generally, however, it is favorable in the embodiment comprising a change in transmittance, in particular reduction in transmittance, that the laser intensity is close to the ablation threshold. According to one refinement of this embodiment of the invention it is contemplated that the laser intensity is below the ablation threshold of the glass ceramic, but at least at 75%, preferably at least at 80% of the ablation threshold.

In the embodiment of the invention in which the glass ceramic 2 is optically modified in the irradiated region by producing local dot-like light scattering defects 23 in the glass ceramic 2, it is advantageous to set the pulse intensity so that inside the glass ceramic the ablation threshold is exceeded, while at the surface of the glass ceramic the pulse intensity remains below the ablation threshold. For a more pronounced formation of defects, burst mode operation is advantageous in this case, in particular for very short pulsed lasers, because the low heat input which is otherwise advantageous is compensated thereby so that considerably larger defects are promoted. In burst mode operation, laser pulses are divided into a series of sub-pulses.

In particular in case of transparent glass ceramics for cooktops, the design of the cooking surface is produced on the lower surface thereof by means of one or more ink layers. Partly, display windows are printed using translucent inks. Below this translucent layer, cooktops manufacturers place their LEDs or other visual displays. In some cases, diffusing sheets and icons are placed above the LEDs. From now on, the patterning of specific icons can be accomplished by coating the lower surface of the glass ceramic and subsequently processing the coating by ablation according to the invention. This even permits to employ standard LEDs in the electronics board arranged below the cooktop and to prepared the specific design by the patterning of the glass ceramic element according to the invention.

Figure 9:
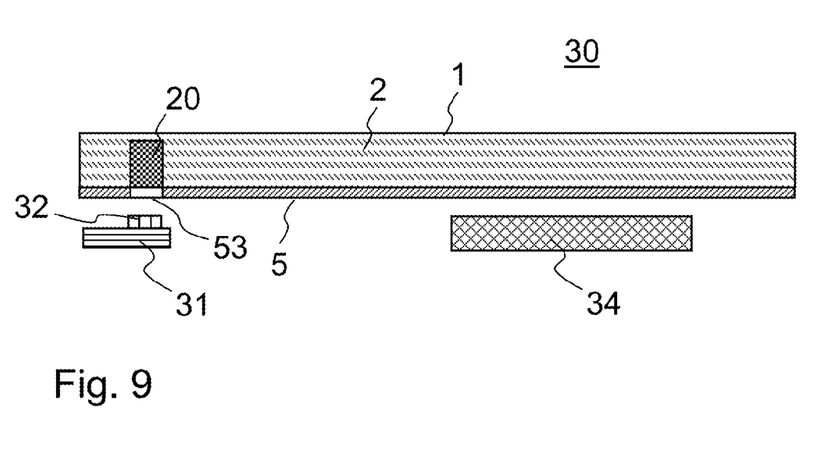
FIG. 9 shows a glass ceramic cooktop.

As an example, FIG. 9 schematically shows a glass ceramic cooktop 30 according to another aspect of the invention. Glass ceramic cooktop 30 comprises a glass ceramic element 1 patterned according to the invention, which constitutes the cooking plate of glass ceramic cooktop 30 and which is disposed above the one or more heating means 34 for heating the cooked product. Below the pattern feature 53 of glass ceramic element 1, which is defined by a region in which the coating 5 has been removed, a light source is positioned so that the light emitted therefrom passes through pattern feature 53 to the utilization side of the glass ceramic cooking plate and is visible to an operating person. The light source preferably comprises a light emitting diode. However, it is likewise possible to provide a light guide as a light source, with the light emitting face thereof disposed below the pattern feature. This makes it possible, for example, to transfer illuminated display elements into the hot zone without exposing to high temperatures the light emitting element (in particular again an LED) which illuminates the light guide.

According to a further embodiment, the light source comprises a display, in particular a matrix display or a segment display. According to this embodiment of the invention, pattern feature 53 may then be a window for this display.

In the embodiment shown in FIG. 9, an electronics board 31 is arranged below pattern feature 53, in particular in the form of a printed circuit board. At least one light emitting diode 32 is mounted on the electronics board. Light emitting diode 32 is arranged so that the light therefrom passes through pattern feature 53 to the upper surface of glass ceramic element 1, that means to the utilization side of the glass ceramic cooktop and is visible there to an operator. Pattern feature 53 thereby provides a patterned illumination which forms an icon that can be seen by the operator due to the light from LED 32. Diffusing sheets may be dispensed with in particular if the first region 20 is provided with light scattering features, such as in particular defects 23 inside the glass ceramic 2 and/or has a dulled surface 24.

In another embodiment of the glass ceramic cooking plate, a film is arranged between the glass ceramic element 1 and the light source, which film has a color similar to the color of the coating.

As an alternative to such film, a translucent coating may be applied on the glass ceramic element 1 in the region where the coating has been removed.

In case of the latter two embodiments, optical modification of the glass ceramic may even be dispensed with, since the visual appearance of the glass ceramic element will be unsuspicious because of the film or the translucent coating.

Preferably, the ΔLab value of the difference of the color values in the Lab color space between the film and the coating or the translucent coating and the surrounding coating is less than 10.

Particularly preferred coatings 5 are sol-gel coatings which form an oxidic network and contain decorative pigments, or which form a matrix of such an oxidic network with embedded decorative pigments after curing. Most preferred oxidic networks are $SiO_2$ networks, or a $SiO_2$ matrix. Optionally, the network may still contain organic radicals. However, the coating 5 is still predominantly inorganic. The decorative pigments are preferably inorganic as well.

Such coatings are highly durable and temperature resistant and can be produced in an almost unlimited number of different visual appearances, depending on the choice of the decorative pigments. However, the patterning of such coatings is a problem, especially if they contain a high proportion of pigments, or if the individual pigment particles are rather large. The latter is the case, for example, when platelet-shaped decorative pigments are used to produce metallic or glitter effects. The inventive method even permits to sever the individual pigment particles and to cut them exactly.

Suitable coating compositions and coatings prepared therefrom are known, inter alia, from DE 10 2008 031 426 A1, and from DE 10 2008 031 428 A1, and content disclosed therein concerning such coating compositions and coatings is hereby fully incorporated by reference into the subject matter of the present application. Accordingly, in one embodiment of the invention a coating 5 is produced in the form of a sealing layer for decorative layers, wherein in a first step the decorative layer is produced by a sol-gel process, which layer is applied on the glass or glass ceramic substrate and cured by baking, and in a second step the decorative layer is covered by a sealing layer which is also produced by a sol-gel process, in which inorganic decorative pigments and fillers are mixed with a sol, wherein the inorganic decorative pigments comprise platelet-shaped pigment particles and inorganic solid lubricant particles which are added in a ratio ranging from 10:1 to 1:1 wt %, preferably from 5:1 to 1:1 wt %, and more preferably from 3:1 to 1.5:1 wt %, and wherein the prepared mixture is applied onto the glass ceramic substrate provided with the cured decorative layer and is then cured at elevated temperatures. The cured sealing layer may have the same composition as the cured decorative layer 5, with the difference that the metal oxide network of the sealing layer has more organic radicals, with respect to the number of organic radicals, preferably at least 5% more organic radicals than the metal oxide network of the decorative layer. Metal oxide network herein also refers to an oxidic network including elements which are semiconducting in elemental form (i.e. in particular the $SiO_2$ network already mentioned, inter alia).

Unlike described before, other sealing layers may likewise be used. In addition to the sol-gel sealing layers described above, silicone layers or silicone-based layers are suitable, for example, to seal an underlying coating. Optionally, plastics may be used as well.

Also, ceramic inks specifically adapted to the requirements of a ceramic lower surface coating may be used on the lower surface. A preferred embodiment of this invention are hybrid layers as described in DE 10 2012 103 507 A1, the contents of which are incorporated herein by reference.

LIST OF REFERENCE NUMERALS

1 Glass ceramic element
2 Glass ceramic
3 Apparatus for producing patterned coatings
10, 11 Face of 1
5 Coating
7 Laser
9 Focusing optical system
13 Control unit
15 Galvanometer scanner
16 X-Y table
20 Optically modified region of 2
21 Contour of 20
22 Region of 2 adjacent to 20
23 Light-scattering defect in 20
24 Matt surface
30 Glass ceramic cooktop
31 Electronics board
32 Light emitting diode
34 Heating means
51 Ink layer
52 Sealing layer
53 Pattern feature
54 Window
55 Contour of 53
71 Laser beam
120, 122, 171, 172,
173 Transmittance curves

What is claimed is:

1. A plate-shaped glass ceramic element, comprising:
a glass ceramic with two opposite faces;
a coating on at least one of the two opposite faces, the coating is at least partially light-blocking; and
a pattern feature defined by a portion of the coating that has been removed,
wherein the glass ceramic includes a first region having an optical property that has been laser-modified relative to an adjacent region, wherein the first region and the adjacent region are monolithic so that the first region and adjacent region merge into each other without joint, the first region having a perimeter that is offset from a perimeter of the pattern feature by not more than 20 µm,
wherein the optical property is light transmittance, wherein the light transmittance of the first region is lowered by at least 2% in the visible spectral range of 380 nm to 780 nm with respect to the adjacent region, and
wherein a difference in light transmittances, $(\tau_1-\tau_2)/(\tau_1+\tau_2)$, with $\tau_2$ the light transmittance of the first region for a specific wavelength in the visible spectral range and $\tau_1$ being the light transmittance of the adjacent region for a specific wavelength in the visible spectral range, is not more than 30%.

2. The glass ceramic element as claimed in claim 1, wherein the difference in light transmittances is not more than 20%.

3. The glass ceramic element as claimed in claim 1, wherein the specific wavelength is from 400 nm to 780 nm.

4. The glass ceramic element as claimed in claim 1, wherein the coating is opaque in the visible spectral range.

5. The glass ceramic element as claimed in claim 1, wherein the coating comprises a plurality of layers.

6. The glass ceramic element as claimed in claim 1, wherein the glass ceramic comprises an element selected from the group consisting of titanium, tin, iron, vanadium, chromium, cerium, neodymium, europium, manganese, colbalt, nickel, zinc, arsenic, antimony, copper, silver, gold, and any combinations thereof,
wherein the first region is laser-modified by volume-coloring, the volume-coloring being sufficient to lower the light transmittance.

7. The glass ceramic element as claimed in claim 1, wherein the first region is laser-modified to form local dot-like light scattering defects in the glass ceramic, the defects being sufficient to lower the light transmittance.

8. The glass ceramic element as claimed in claim 1, wherein the first region is laser-modified to form a matt surface in the glass ceramic, the defects being sufficient to lower the light transmittance.

9. The glass ceramic element as claimed in claim 1, wherein the removal of the portion of the coating defining the pattern feature is done by a laser.

10. The glass ceramic element as claimed in claim 1, wherein the glass ceramic element is configured for use as a glass ceramic cooking plate, and further comprising a light source positioned so that light therefrom passes through the pattern feature.

11. The glass ceramic element as claimed in claim 10, wherein the light source comprises an electronics board having at least one light emitting diode mounted thereon.

12. The glass ceramic element as claimed in claim 10, further comprising a translucent film or translucent coating arranged between the glass ceramic element and the light source, wherein the translucent film or the translucent coating has a color similar to a color of the coating.

* * * * *